United States Patent
Saleh et al.

(10) Patent No.: US 11,321,903 B2
(45) Date of Patent: May 3, 2022

(54) BOUNDING VOLUME HIERARCHY COMPRESSION

(71) Applicant: Advanced Micro Devices, Inc., Santa Clara, CA (US)

(72) Inventors: Skyler Jonathon Saleh, San Diego, CA (US); Young In Yeo, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/832,109

(22) Filed: Mar. 27, 2020

(65) Prior Publication Data

US 2021/0304484 A1    Sep. 30, 2021

(51) Int. Cl.
*G06T 15/10* (2011.01)
*G06T 15/00* (2011.01)
*G06T 15/06* (2011.01)

(52) U.S. Cl.
CPC ............ *G06T 15/005* (2013.01); *G06T 15/06* (2013.01); *G06T 2210/12* (2013.01); *G06T 2210/21* (2013.01)

(58) Field of Classification Search
CPC ... G06T 15/06; G06T 2210/12; G06T 17/005; G06T 9/40; G06T 2210/21; G06T 9/001; G06F 16/9027
See application file for complete search history.

(56) References Cited

U.S. PATENT DOCUMENTS

| | | | |
|---|---|---|---|
| 2016/0071234 A1* | 3/2016 | Lehtinen | G06T 15/10 345/420 |
| 2020/0051314 A1* | 2/2020 | Laine | G06T 15/06 |

* cited by examiner

*Primary Examiner* — Hau H Nguyen
(74) *Attorney, Agent, or Firm* — Volpe Koenig

(57) ABSTRACT

A technique for performing ray tracing operations is provided. The technique includes receiving a ray for an intersection test, testing the ray against boxes specified in a bounding volume hierarchy to eliminate one or more boxes or triangles from consideration, unpacking a triangle from a compressed triangle block of the bounding volume hierarchy, the compressed triangle block including two or more triangles that share at least one vertex, and testing the ray for intersection against at least one of the unpacked triangles.

20 Claims, 7 Drawing Sheets

BOUNDING VOLUME HIERARCHY COMPRESSION

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes receiving a ray for an intersection test, testing the ray against boxes specified in a bounding volume hierarchy to eliminate one or more boxes or triangles from consideration, unpacking a triangle from a compressed triangle block of the bounding volume hierarchy, the compressed triangle block including two or more triangles that share at least one vertex, and testing the ray for intersection against at least one of the unpacked triangles.

Figure 1:
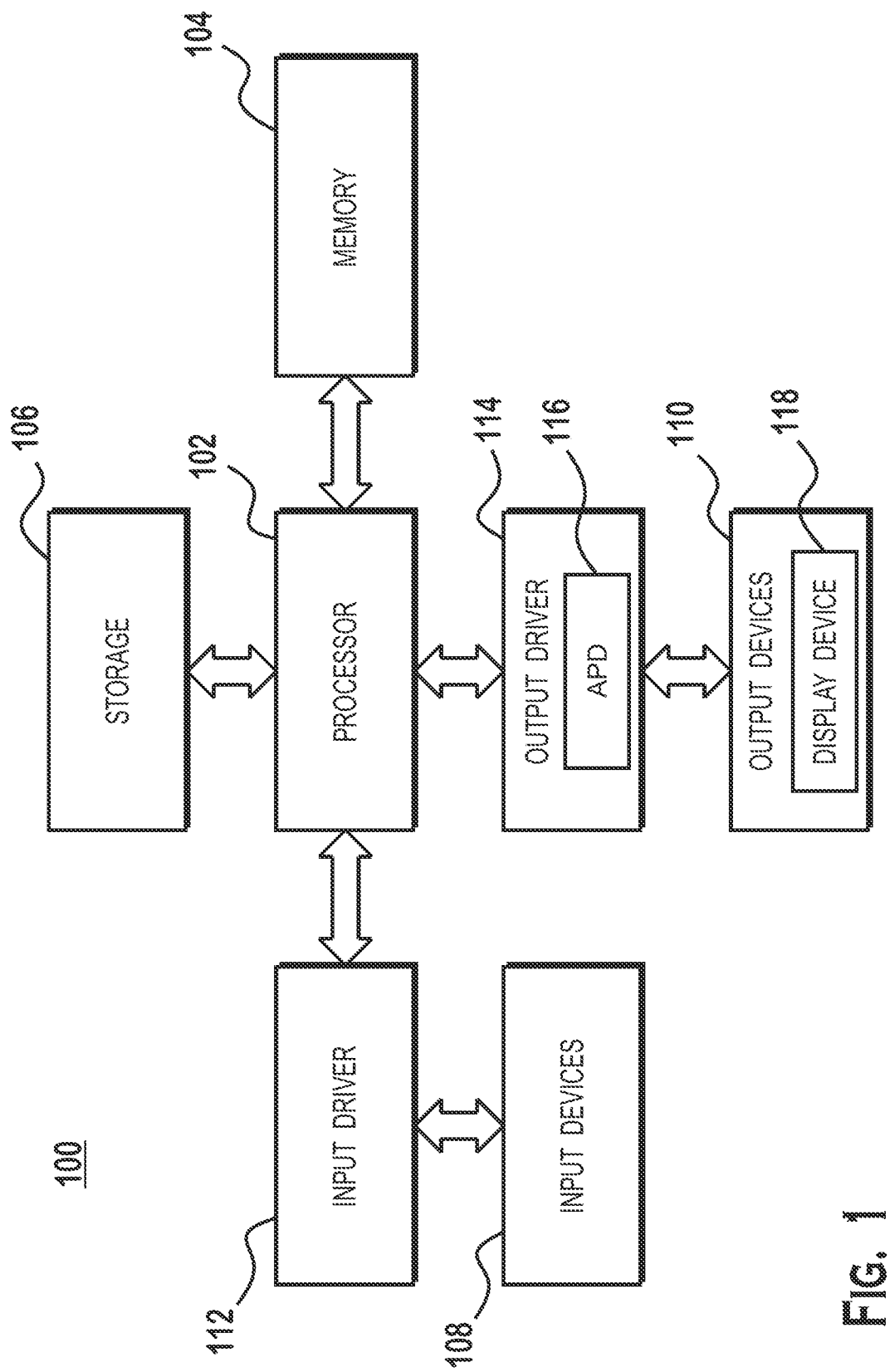
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
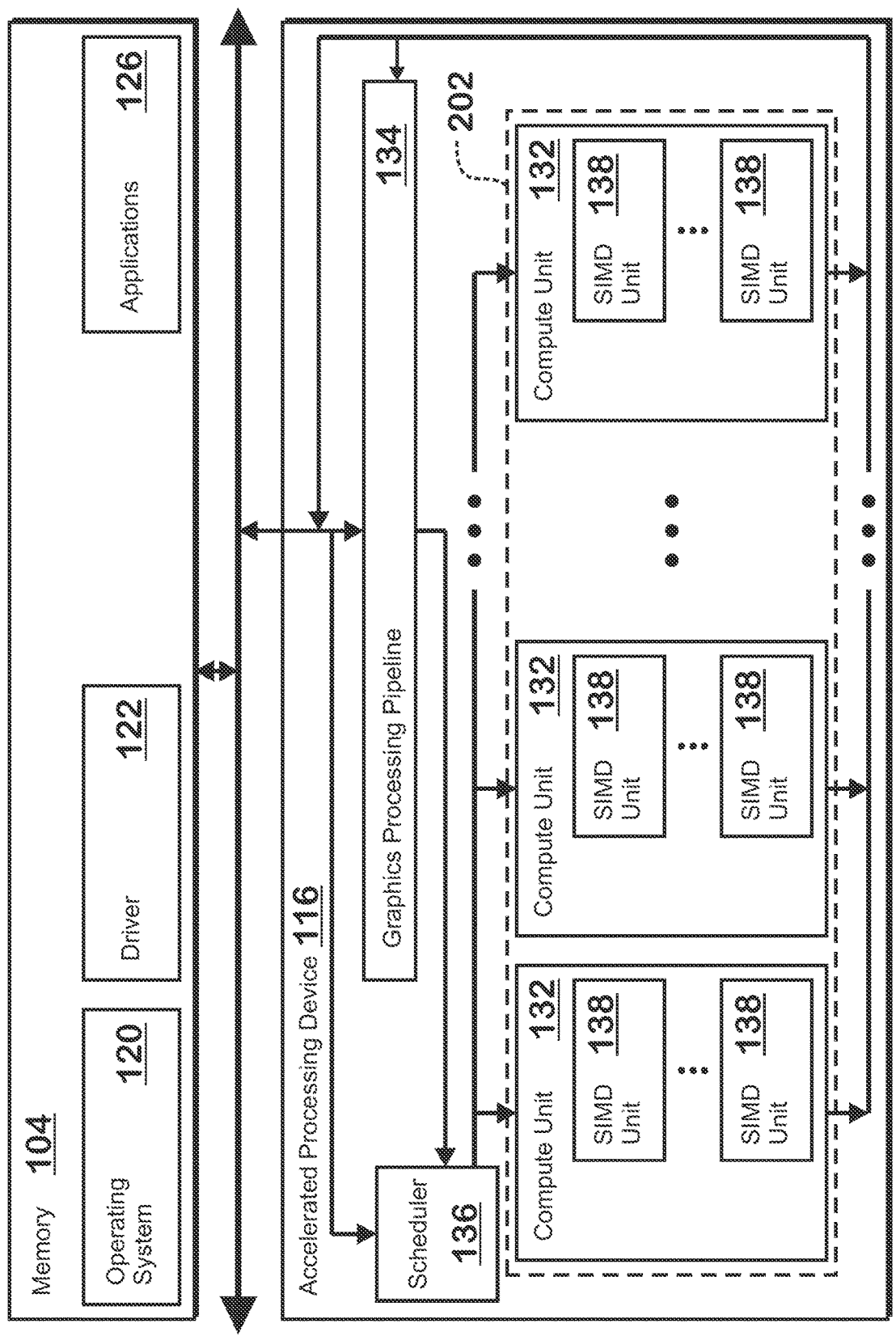
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (together, parallel processing units 202) that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
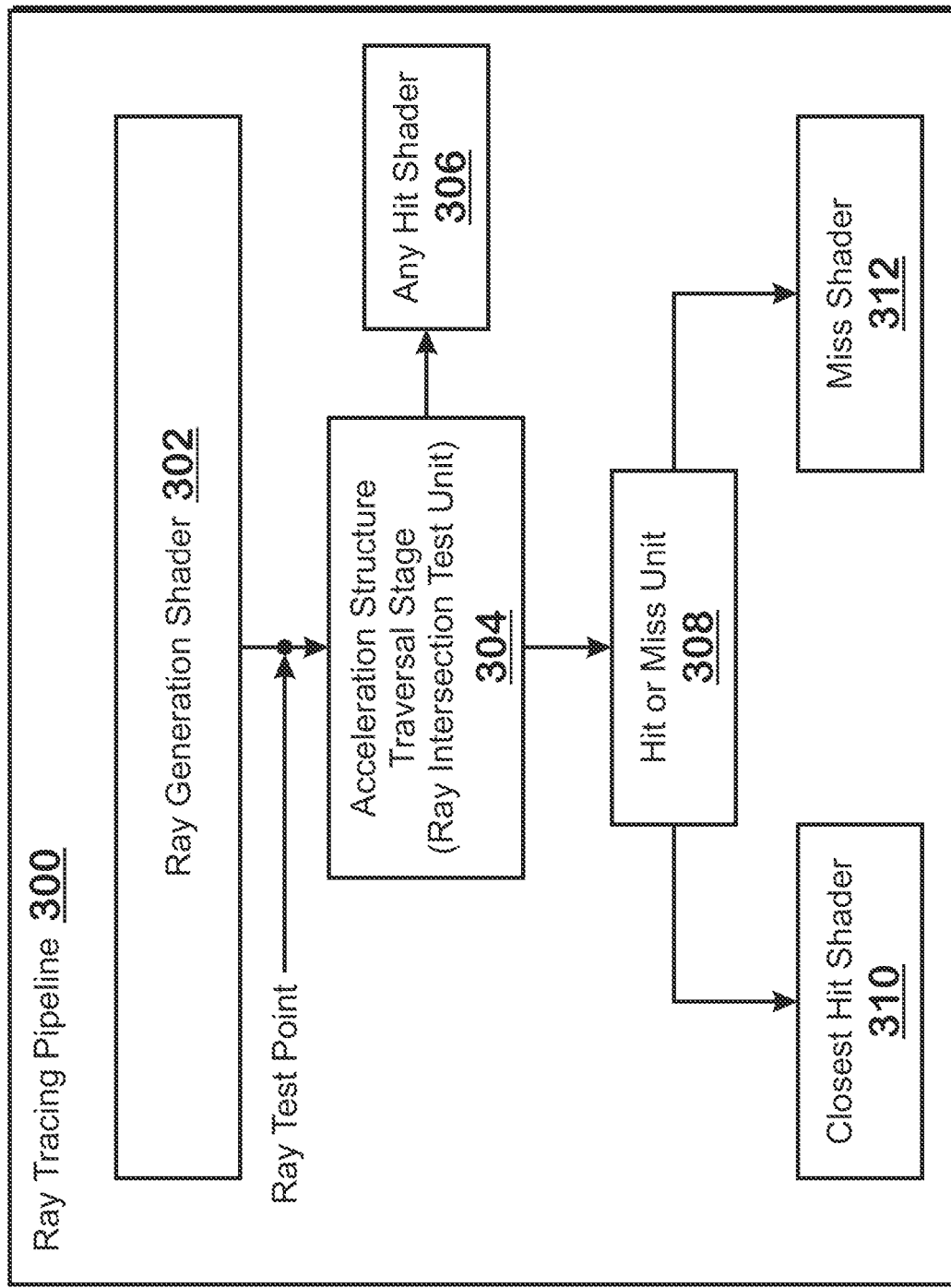
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing. While it is possible to obtain multiple samples per pixel by casting multiple rays per pixel, techniques are provided herein for obtaining multiple samples per ray so that multiple samples are obtained per pixel by casting only one ray. It is possible to perform such a task multiple times to obtain additional samples per pixel. More specifically, it is possible to cast multiple rays per pixel and to obtain multiple samples per ray such that the total number of samples obtained per pixel is the number of samples per ray multiplied by the number of rays per pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
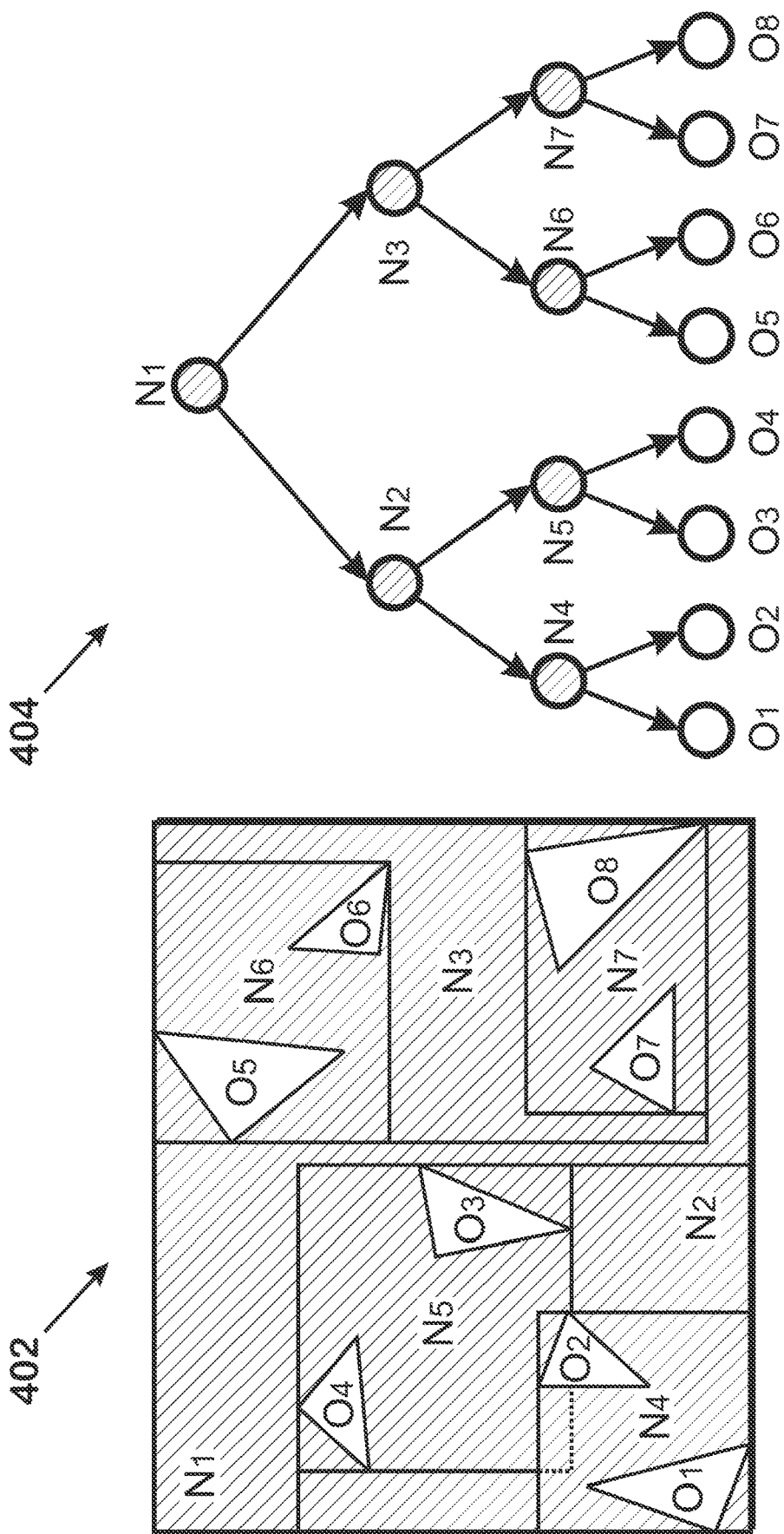
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

Figure 5:
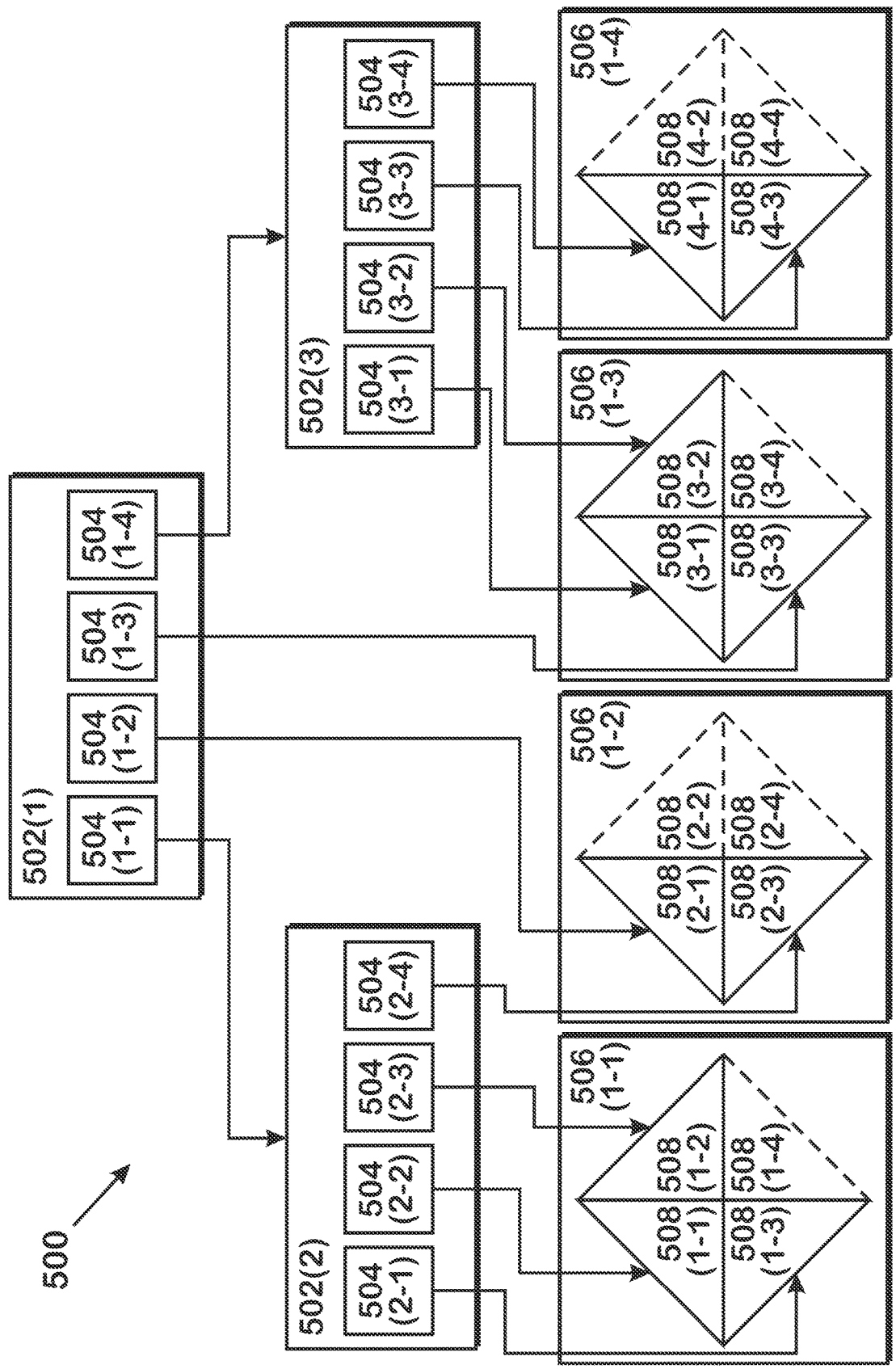
FIG. 5 illustrates an example bounding volume hierarchy including box blocks and compressed triangle blocks.

Disclosed herein are techniques for using a compressed bounding volume hierarchy to perform ray tracing operations. FIG. 5 illustrates an example bounding volume hierarchy 500 including box blocks 502 and compressed triangle blocks 506. A block, such as a box block 502 or a compressed triangle block 506, represents a unit of data that includes data for multiple geometry elements (such as boxes or triangles). In some implementations, each block has a certain size. In some implementations, the size of a block is the same size as the size of a cache line.

A box block 502 includes data for one or more boxes 504, which are similar to the boxes ("N") of FIG. 4. Each box 504 includes a pointer to one or more other boxes 504 in a different box block 502 or one or more triangles 508 in a triangle block 506.

A triangle block 506 includes data for one or more triangles 508, which are similar to the triangles ("O") of FIG. 4. The data for multiple triangles 508 are compressed within a triangle block 506. More specifically, the triangles that are included within a triangle block 506 share at least some vertices, which allows for a reduction in total amount of data stored by allowing for elimination of redundant vertex data. In an example, a triangle block 506 includes data for two triangles 508. A first triangle 508 in the triangle block 506 includes vertices v0, v1, and v2, and a second triangle 508 in the triangle block 506 includes vertices v0, v3, and v4. In this instance, the first triangle and the second triangle share vertex v0 (meaning that this vertex has the same coordinate values), which allows one instance of vertex v0 to not be stored in the triangle block 506.

Each triangle block 506 has requirements for triangles 508 to be included in that block 506. These requirements relate to how vertices are shared between the triangles 508. More specifically, the requirements specify, for any particular triangle 508, which vertices of other triangles in the triangle block 506 are shared with that triangle 508. In the example of FIG. 5, each triangle 508 in a triangle block 506 must share one vertex (the central vertex shown) with each other triangle 508 in the triangle block 506, and each triangle must also share its two other vertices with one other triangle 508. Although a specific sharing configuration is shown, it should be understood that any combination of shared vertices may be used in compressed triangle blocks.

In addition, each triangle block 506 has a maximum number of triangles 508 that can be stored in the triangle block. For some triangle blocks 506, there are not enough triangles in a scene that meet all the requirements of the triangle block 506 to reach the maximum number of triangles 508. In such instances, one or more triangles 508 in a triangle block 506 is unused. Put differently, in such instances, the space of the triangle block 506 that would be used to store information for a triangle is considered to be invalid. In the figures, an unused triangle is illustrated with dotted lines. In the example of FIG. 5, triangle block 506(1-1) and triangle block 506(1-3) have one unused triangle (triangle 508(1-4) and triangle 508(3-4)) and triangle block 506(1-2) and triangle block 506(1-4) have two unused triangles (triangles 508(2-2) and 508(2-4) in triangle block 506(1-2) and triangles 508(4-2) and 508(4-4) in triangle block 506(1-4)).

To traverse the illustrated BVH 500, the ray tracing pipeline 300 begins at a box 504 and tests the box 504 for intersection with the ray. If the intersection fails, then the ray tracing pipeline 300 eliminates all children of that box 504 from consideration. If the intersection does not fail, then the ray tracing pipeline 300 tests the children of that box 504. Some boxes 504 point to other boxes 504 and some boxes point to triangles 508. In response to the ray tracing pipeline 300 arriving at a triangle 508, the ray tracing pipeline 300 performs a ray intersection test to determine whether the ray intersects the triangle. The ray tracing pipeline 300 extracts data for each such triangle, by identifying which vertices below to a triangle and locating the vertex data from either a vertex unique to that triangle 508 or from a vertex that is shared between triangles 508.

Figure 6:
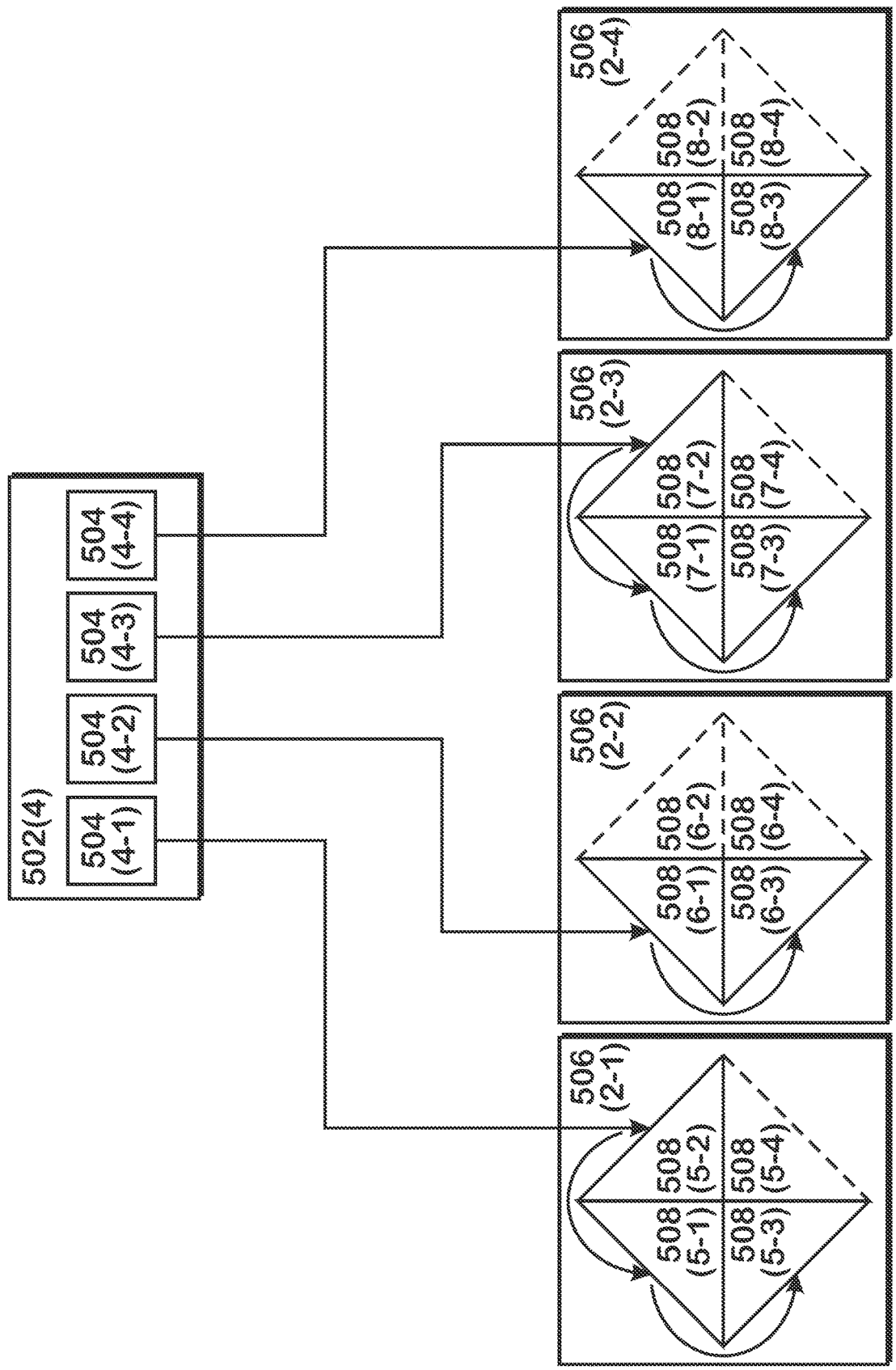
FIG. 6 illustrates a referencing feature of boxes, according to an example.

FIG. 6 illustrates a referencing feature of boxes 504, according to an example. In some implementations, requirements for belonging in a triangle block 506 include that each triangle 508 in a triangle block 506 must be within the same bounding box (i.e., in the bounding box represented by a box 504 that points to a triangle in the triangle block 506), in addition to other requirements such as vertex sharing requirements.

In these implementations, it is possible for the pointer from a box 504 to one or more triangles 508 to include less information than in the situation where multiple triangles 508 that do not fit within a single box 504 are permitted to be in a triangle block 506. More specifically, where multiple triangles 508 that do not fit within a single box 504 are permitted to be in a triangle block 506, a pointer from a box 504 specifies which triangles in that triangle block 506 are pointed to by the box 504. Where a triangle block 506 is limited to including triangles 508 that fall within the same box 504 (and specifically, the box 504 that includes a pointer to at least one of the triangles 508), the ray tracing pipeline 300 knows to search through each valid triangle in that triangle block 506 (where an invalid triangle is data for an unused triangle and a valid triangle is data for a triangle that is in use). In some examples, a box 504 that points to a triangle 508 in a triangle block 506 includes information indicating which triangles 508 in that triangle block are valid. In other examples, the triangle block 506 itself includes information indicating which triangles 508 in that triangle block 506 are valid. In either example, during bounding volume hierarchy traversal, the ray tracing pipeline 300 iterates through the valid triangles of a triangle block 506, following the pointer from a box 504 to a triangle 508, and testing each of the valid triangles as indicated either by the pointer or the triangle block 506.

In FIG. 6, aspects of an example bounding volume hierarchy traversal are shown. More specifically, each illustrated box 504 is illustrated as pointing to one triangle 508 of a triangle block 506. FIG. 6 also illustrates one or more arrows from triangles 508 of the triangle blocks 506 to other triangles 508 of the triangle blocks 506. Each such arrow indicates an example "jump" order for the ray tracing pipeline 300 to follow when traversing the bounding volume hierarchy. More specifically, these arrows illustrate how the ray tracing pipeline 300 uses the information stored in the box 504 itself or in the triangle block 506 to move through the triangles 508 of the triangle block in the course of testing those triangles 508 against the ray. In some examples, the triangle blocks 506 include the data for each triangle 508 laid out consecutively. In such examples, the ray tracing pipeline 300 accesses a particular triangle 508 via a base address and an offset. In some examples, the base address is the address of a first triangle 508. In some examples, the ray tracing pipeline 300 skips offsets associated with invalid triangles. In some examples, invalid triangles always have higher offsets than valid triangles. In other examples, any offset is permitted to be an invalid triangle. In some examples, all valid triangles are consecutive in memory, with invalid triangles being adjacent to the consecutive portion of memory storing the data for the valid triangles. To advance from the base triangle to the next triangle, the ray tracing pipeline 300 increments or decrements the value of the pointer. In an example, a base triangle of triangle block 506(2-3) is triangle 508(7-2). In this example, after processing the base triangle 508(7-2), the ray tracing pipeline 300 decrements the pointer, which then points to triangle 508 (7-1). In this example, after processing this triangle 508(7-1), the ray tracing pipeline 300 decrements the pointer, which then points to triangle 508(7-3). Since triangle 508 (7-4) is invalid, the ray tracing pipeline 300 does not process that triangle 508(7-4).

Note that in FIG. 6, a relatively simply bounding volume hierarchy is illustrated, including only one box block 502. However, it should be understood that the features of the illustrated box block 502 and triangle blocks 506 are applicable to any bounding volume hierarchy configuration (e.g., with any number of box blocks 502 and triangle blocks 506, with any feasible interconnectivity between boxes 504 and other boxes 504 and boxes 504 and triangles 506).

In addition to the box block 502 and the triangle block 506, FIG. 6 also illustrates sideband data 602. The sideband data 602 is external to the blocks. The sideband data 602 includes information identifying the triangles 508. In some examples, the sideband data 602 includes triangle identification numbers. These triangle identification numbers uniquely identify the triangles 508. The sideband data 602 associates specific triangles 508 in specific triangle blocks 506 (e.g., by triangle base address and offset or by triangle block identifier and offset) with triangle identification numbers that are known to the application that requested rendering of the triangles. In some examples, the sideband data 602 includes geometry identification numbers. "Geometry" refers to an application-defined group of triangles such as a mesh. The sideband data 602 thus associates specific triangles 508 in the bounding volume hierarchy with specific "geometry" such as a specific application-defined mesh. In some examples, the sideband data 602 includes geometry flags. In some examples, geometry flags indicate a position of a triangle 508 within an associated geometry. In some examples, this position is indicated with coordinates such as i, j coordinates. In various examples, any combination of the above example types of information are stored together in the sideband data 602.

Figure 7:
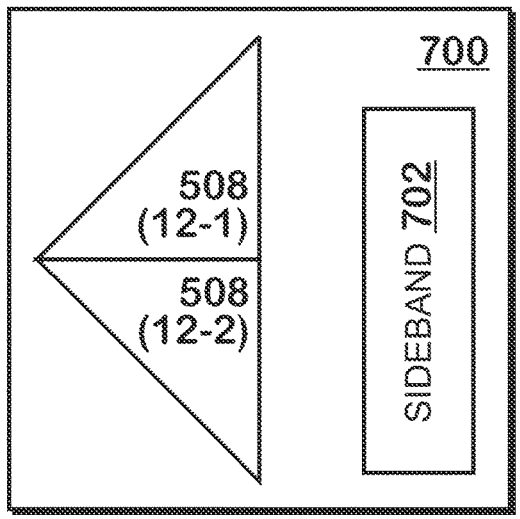
FIG. 7 illustrates an example triangle block according to an example.

FIG. 7 illustrates an example triangle block 700 according to an example. The example triangle block 700 is similar to the triangle block 506 of FIGS. 5 and 6, except that the example triangle block 700 includes sideband data 702, which includes similar information to the sideband data 602 of FIG. 6. More specifically, the sideband data 702 of FIG. 7 is included within the data structure of a triangle block 700, while the sideband data 602 of FIG. 6 is external to the triangle blocks 506. In some examples, because the sideband data 702 is included in the triangle blocks 700, there is less space in the triangle blocks 700 for triangles 508. Thus if the triangle block 700 is the same size (takes up the same number of bytes) as the triangle block 506, then fewer triangles are stored in the triangle block 700 than in the triangle block 506.

In the specific example illustrated, the triangle block 700 includes triangles 508 that share two vertices, and thus the total number of vertices needed to represent the two triangles 508 is four. In other examples or modes of operation, however, the triangles 508 in a triangle block are only required to share one vertex.

Note that the ray tracing pipeline 300, when processing the triangle blocks 700, is able to access the different triangles 508 in a similar manner as described with respect to FIG. 6. In some examples, a box 504 includes a pointer that explicitly indicates which triangles 508 to process. In other examples, a box 504 includes a pointer to a base triangle 504, whose address is incremented or decrement by the ray tracing pipeline 300 to access other triangles 508 until all valid triangles 508 are accessed. Any other example technique for accessing triangles 508 of the triangle block 700 described herein are alternatively used.

In various examples, any of a variety of entities generates a compressed bounding volume hierarchy such as the bounding volume hierarchy 500 of FIG. 5, including triangle blocks such as the triangle blocks 506 of FIGS. 5 and 6 or the triangle block 700 of FIG. 7. In some examples, a compiler reads scene data generated by an application developer and generates the compressed bounding volume hierarchy as described herein. In another example, an application 126 or the APD 116 generates the compressed bounding volume hierarchy as described herein. In any such example, the entity that generates the compressed bounding volume hierarchy notes the vertices that are shared and eliminates copies of such vertices. The entity also encodes, either implicitly or explicitly, the data for the triangles in a manner that indicates which vertices are shared between which triangles.

Figure 8:
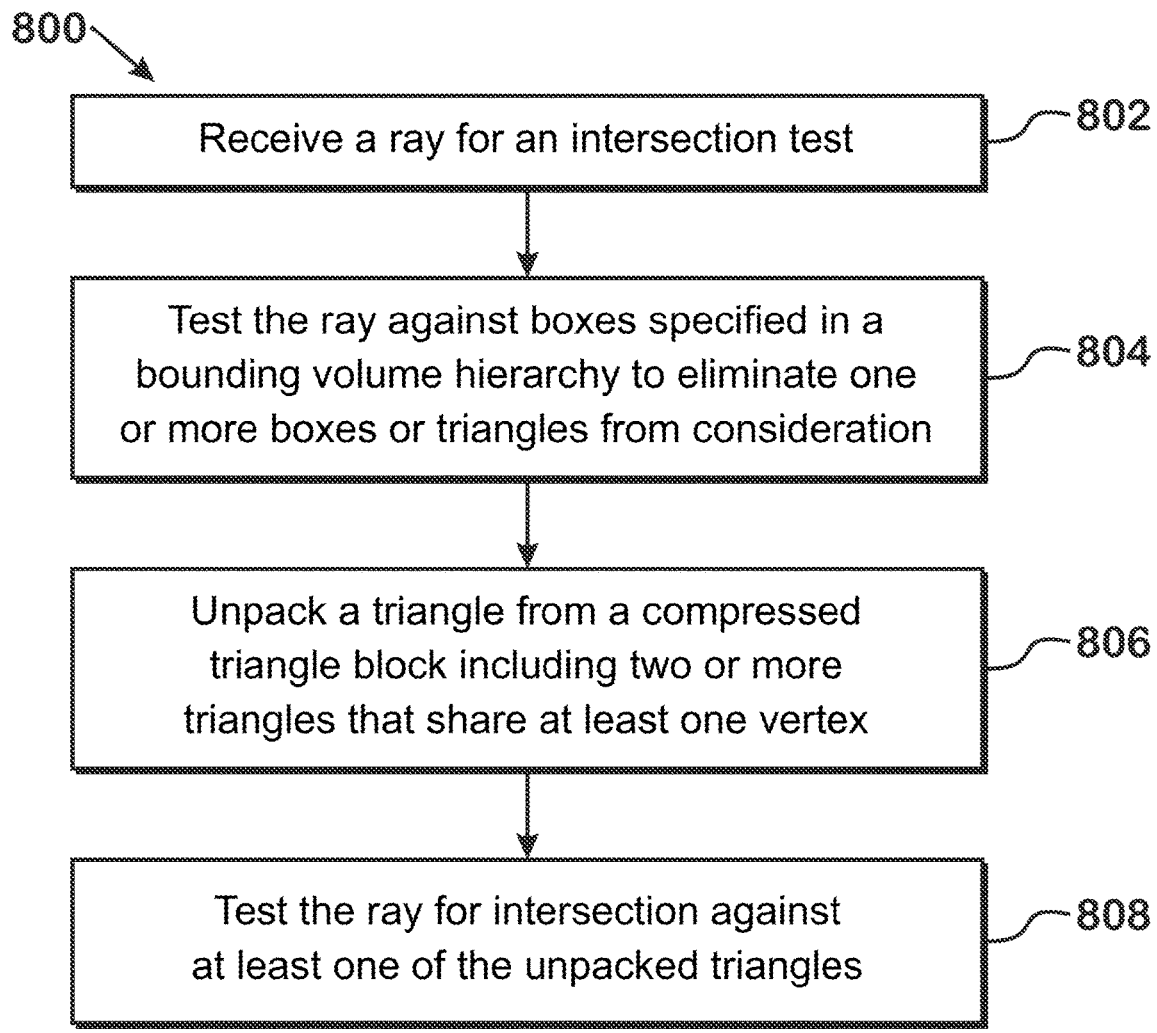
FIG. 8 is a flow diagram of a method for performing ray tracing operations, according to an example.

FIG. 8 is a flow diagram of a method 800 for performing ray tracing operations, according to an example. Although described with respect to the system of FIGS. 1-7, those of skill in the art will understand that any system configured to perform the steps of the method 800 in any technically feasible order falls within the scope of the present disclosure.

At step 802, the ray tracing pipeline 300 receives a ray for an intersection test. In various examples, the ray is received from a shader program executing on a compute unit 132, from the scheduler 136, or from an application 126.

At step 804, the ray tracing pipeline 300 tests the ray against boxes 504 specified by a bounding volume hierarchy (such as the bounding volume hierarchy 500 of FIG. 5). A ray that does not intersect a box 504 causes the ray tracing pipeline 300 to eliminate from consideration all children of that box 504. A ray that intersects a box 504 does not cause the ray tracing pipeline 300 to eliminate from consideration all children of that box 504.

At step 806, the ray tracing pipeline 300 arrives at a compressed triangle block (such as a triangle block 506 or a triangle block 700) and unpacks a triangle from that block. The triangle block includes two or more triangles that share at least one vertex. Unpacking a triangle from a compressed triangle block includes obtaining the vertices of that triangle, where at least one of those vertices is shared between the triangles. Thus unpacking involves obtaining at least one shared vertex and combining that shared vertex with the other vertices of the triangle. At step 808, the ray tracing pipeline 300 tests the ray for intersection against at least one of the unpacked triangles.

Note that although the present disclosure describes triangles as being in the leaf nodes of the bounding volume hierarchy, any other geometric shape could alternatively be used in the leaf nodes. In such instances, compressed triangle blocks include two or more such primitives that share at least one vertex.

Each of the units illustrated in the figures represent hardware circuitry configured to perform the operations described herein, software configured to perform the operations described herein, or a combination of software and hardware configured to perform the steps described herein. For example, the ray tracing pipeline 300, ray generation shader 302, any hit shader 306, hit or miss unit 308, miss shader 312, closest hit shader 310, and acceleration structure traversal stage 304 are implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:
   receiving a ray for an intersection test;
   testing the ray against boxes specified in a bounding volume hierarchy to eliminate one or more boxes or triangles from consideration, wherein the bounding volume hierarchy includes compressed triangle blocks, wherein each compressed triangle block of the compressed triangle blocks includes two or more triangles that share a central vertex, wherein, for each triangle block, each triangle of the triangle block shares the central vertex;
   unpacking a triangle from a compressed triangle block of the compressed triangle blocks of the bounding volume hierarchy; and
   testing the ray for intersection against at least one of the unpacked triangles.

2. The method of claim 1, wherein:
   at least one compressed triangle block of the bounding volume hierarchy includes a first triangle pointed to by a first box of the bounding volume hierarchy and a second triangle pointed to by a second box of the bounding volume hierarchy.

3. The method of claim 2, wherein data for the first box indicates triangles of the at least one compressed triangle block that are within a bounding box associated with the first box.

4. The method of claim 1, wherein:
   no compressed triangle block of the bounding volume hierarchy includes two triangles that are pointed to by different boxes of the bounding volume hierarchy.

5. The method of claim 4, wherein:
   a first box of the bounding volume hierarchy points to at least two triangles within the compressed triangle block.

6. The method of claim 5, wherein:
   the first box includes information indicating which triangles of the compressed triangle block are valid.

7. The method of claim 5, wherein:
   the compressed triangle block includes information indicating which triangles of the compressed triangle block are valid.

8. The method of claim 1, wherein:
   the compressed triangle block includes metadata correlating triangles within the compressed triangle block to triangles specified by an application.

9. The method of claim 1, wherein:
   metadata correlating triangles within the compressed triangle block to triangles specified by an application is stored external to all triangle blocks of the bounding volume hierarchy.

10. A system for performing ray tracing operations, the system comprising:
    a ray tracing pipeline processor configured to:
    receive a ray for an intersection test;
    test the ray against boxes specified in a bounding volume hierarchy to eliminate one or more boxes or triangles from consideration, wherein the bounding volume hierarchy includes compressed triangle blocks, wherein each compressed triangle block of the compressed triangle blocks includes two or more triangles that share a central vertex, wherein, for each triangle block, each triangle of the triangle block shares the central vertex;
    unpack a triangle from a compressed triangle block of the compressed triangle blocks of the bounding volume hierarchy; and
    test the ray for intersection against at least one of the unpacked triangles.

11. The system of claim 10, wherein:
    at least one compressed triangle block of the bounding volume hierarchy includes a first triangle pointed to by a first box of the bounding volume hierarchy and a second triangle pointed to by a second box of the bounding volume hierarchy.

12. The system of claim 11, wherein data for the first box indicates triangles of the at least one compressed triangle block that are within a bounding box associated with the first box.

13. The system of claim 10, wherein:
no compressed triangle block of the bounding volume hierarchy includes two triangles that are pointed to by different boxes of the bounding volume hierarchy.

14. The system of claim 13, wherein:
a first box of the bounding volume hierarchy points to at least two triangles within the compressed triangle block.

15. The system of claim 14, wherein:
the first box includes information indicating which triangles of the compressed triangle block are valid.

16. The system of claim 14, wherein:
the compressed triangle block includes information indicating which triangles of the compressed triangle block are valid.

17. The system of claim 10, wherein:
the compressed triangle block includes metadata correlating triangles within the compressed triangle block to triangles specified by an application.

18. The system of claim 10, wherein:
metadata correlating triangles within the compressed triangle block to triangles specified by an application is stored external to all triangle blocks of the bounding volume hierarchy.

19. A non-transitory computer-readable medium storing instructions that, when executed by a processor, cause the processor to perform ray tracing operations by:

receiving a ray for an intersection test;

testing the ray against boxes specified in a bounding volume hierarchy to eliminate one or more boxes or triangles from consideration, wherein the bounding volume hierarchy includes compressed triangle blocks, wherein each compressed triangle block of the compressed triangle blocks includes two or more triangles that share a central vertex, wherein, for each triangle block, each triangle of the triangle block shares the central vertex;

unpacking a triangle from a compressed triangle block of the compressed triangle blocks of the bounding volume hierarchy; and testing the ray for intersection against at least one of the unpacked triangles.

20. The non-transitory computer-readable medium of claim 19, wherein:
at least one compressed triangle block of the bounding volume hierarchy includes a first triangle pointed to by a first box of the bounding volume hierarchy and a second triangle pointed to by a second box of the bounding volume hierarchy.

* * * * *